Patented Apr. 28, 1942

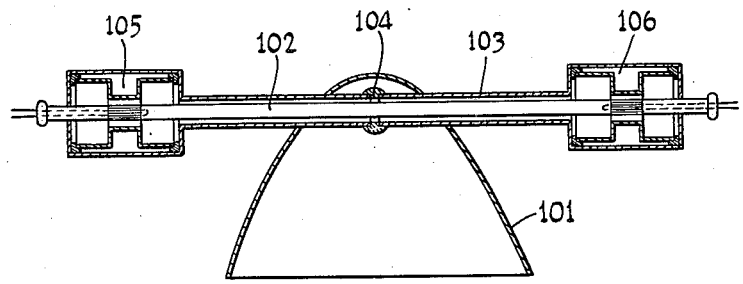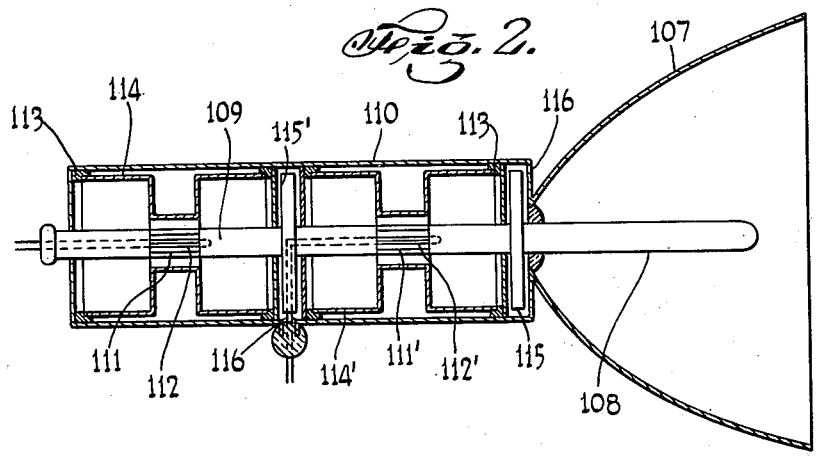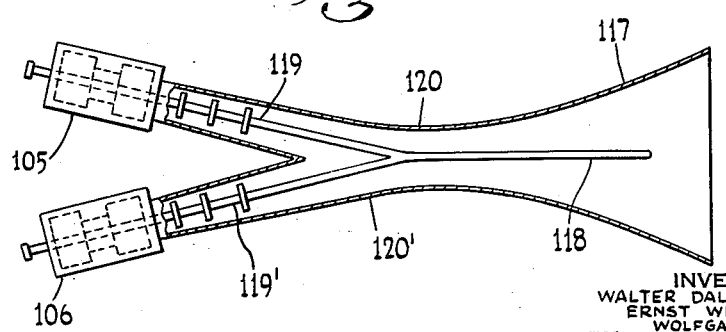

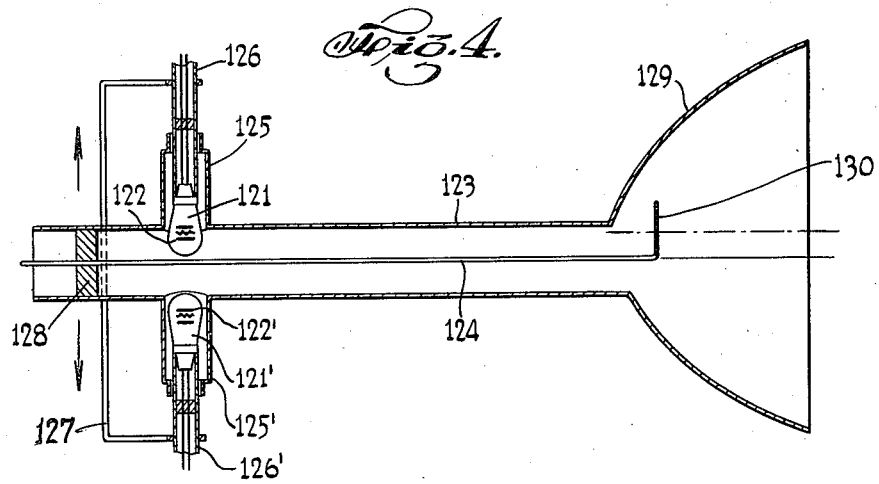
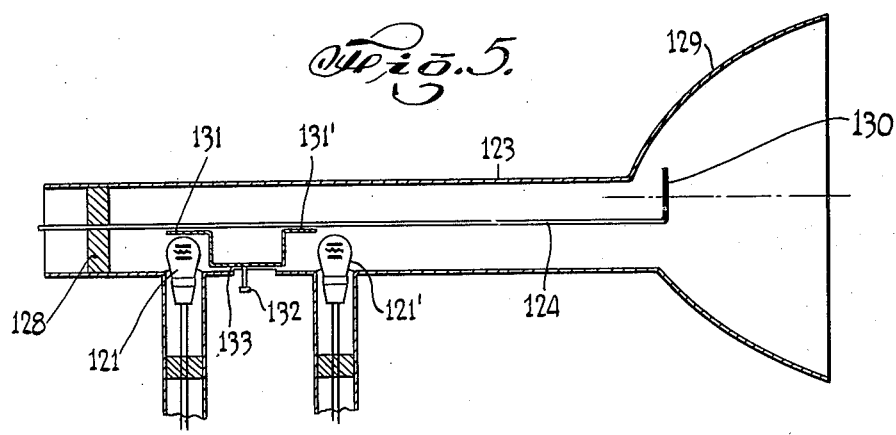
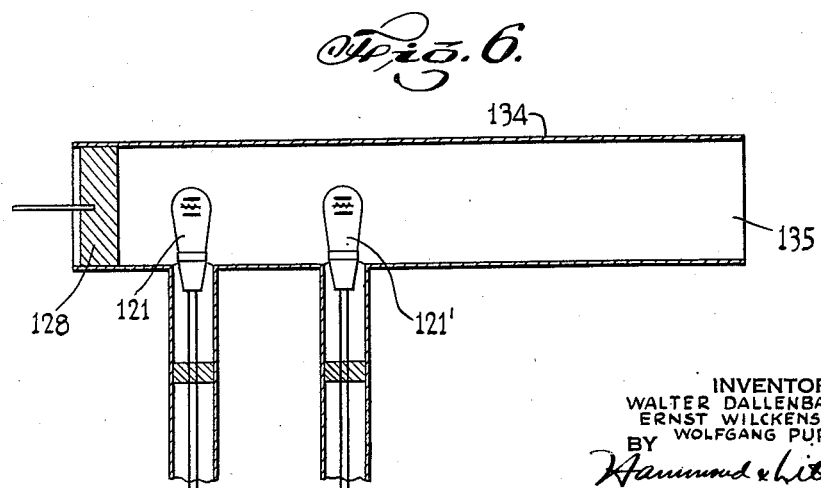

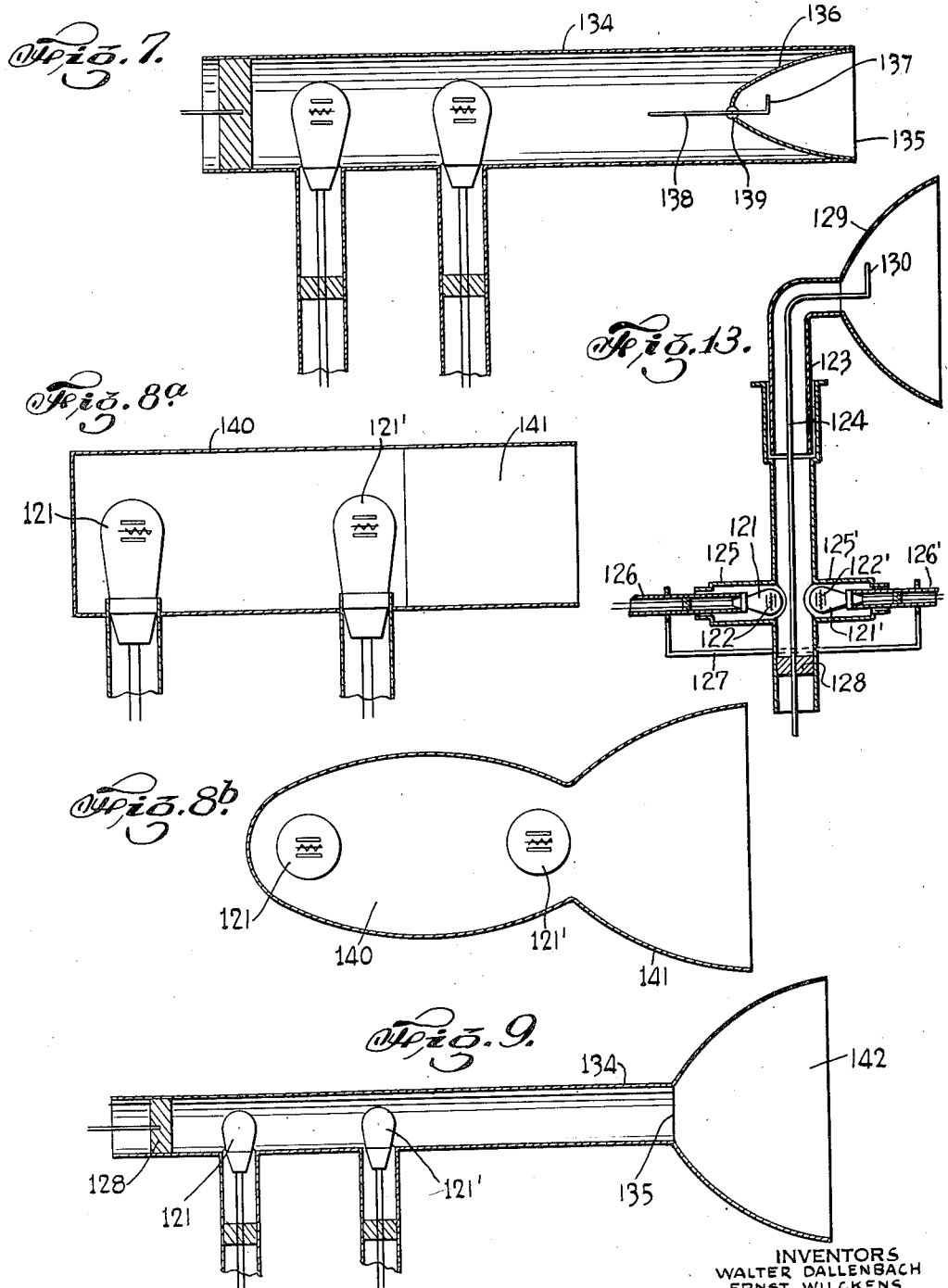

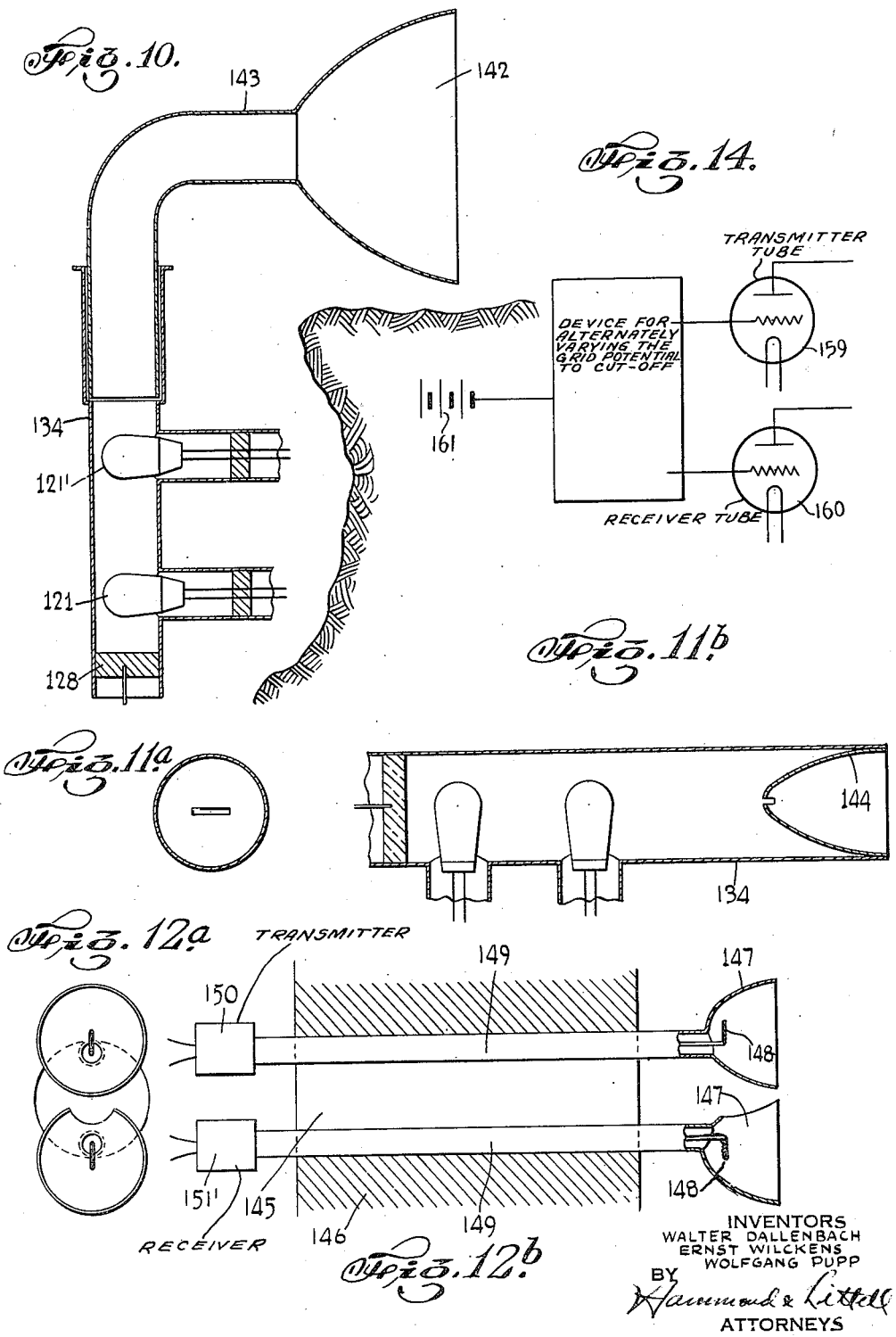

2,281,274

UNITED STATES PATENT OFFICE 2,281,274

ULTRA SHORT WAVE RADIATOR

Walter Dallenbach, Berlin-Charlottenburg, Ernst Wilckens, Berlin-Sudende, and Wolfgang Pupp, Berlin-Kopenick, Germany Application July 12, 1938, Serial No. 218,752 In Germany March 25, 1936

13 Claims. (Cl. 250—11)

The invention refers to a system for transmitting and receiving ultra-short electromagnetic waves, especially waves of the decimetre and centimetre range.

It is known to provide separate radiator or antenna constructions for arrangements of this kind. The entire equipment, however, becomes unduly large and heavy by the use of separate radiators and receivers, respectively.

The subject of the invention is a system which avoids these disadvantages. According to the invention, an ultra-short wave equipment is provided, preferably for directional intercommunication, in which a transmitter and a receiver cooperate with a mutual antenna construction which is especially suited for directive transmission and reception.

The structural embodiment of the invention becomes particularly simple if the transmitter and receiver operate with different but adjacent wave lengths. A relatively slight difference in the natural frequency of the transmitter and receiver is here sufficient to uncouple the two so that simultaneous operation of transmitter and receiver is possible. The natural frequency of the antenna system provided in common for the transmitter and the receiver is advantageously selected in such a manner that it lies between the natural frequencies of the transmitter and the receiver. The dis-tuning between the transmitter and the antenna system on the one hand and between the receiver and the antenna system on the other hand can then be made at least approximately equally great. Another possibility of avoiding injuriously affecting the transmitter and the receiver consists in providing filtering means between the transmitter and the receiver, or in the energy conducting device which couples the same to the antenna system. Filtering means suitable for this purpose are disclosed in an earlier application, Serial No. 18,232, filed April 25, 1935. According to that disclosure, the energy conducting device between the transmitter and the receiver and the antenna system may consist of periodically repeating resonance elements over the length of which the characteristic impedance varies. Another possibility of preventing the receiver from being subjected to undue stress by its own transmitter consists in providing the receiver with reception limiting devices. The latter is of advantage also when the transmitter and the receiver operate at the same wave length.

When the transmitter and the receiver are to operate on the same wave length, the difficulties then occurring may be avoided most simply by causing the transmitter and the receiver to cooperate alternately with the antenna system.

For carrying out this invention there are various possibilities. One possibility consists in coupling the transmitter and the receiver alternately with the antenna arrangement, in which case it is of advantage to keep the transmitter and the receiver ready for operation. A second possibility consists in making the transmitter and the receiver ready for operation and blocking them alternately. Such a periodical reversal may be effected, for example, by way of audible frequencies, or even by way of above audible or high frequencies. It is of advantage to proceed in such manner that the thermic loading of the tube, especially of the receiving tube, remains unaltered in order to prevent an alteration of wave length from occurring through variations of temperature.

Tubes suitable for use as the transmitter and the receiver are those which are subdued or induced to oscillations in one of the known connections, for example in the retro-coupling connection, the braking field connection or the electromagnetic connection, and so on. Since with such tubes oscillations exist or a reception sensitiveness is present only under quite definite operating conditions, particular potentials at the electrodes, the reversal may occur readily through relatively slight alterations of the operating potentials. This proves to be especially advantageous for maintaining the constancy of the thermic loading of the tube. It has also been found that by utilizing the braking field connection with the transmitting tube preferably the grid potential, and with the receiving tube preferably the brake electrode potential will be changed, in order to disturb the operating conditions of the two tubes as little as possible. Since with tubes in the braking field connection changes of the potential at the electrodes frequently cause alteration of the wave length, it is also sufficient to alter the operating potentials of the transmitter and the receiver so much that a sufficient dis-tuning of both occurs.

An advantageous embodiment of the inventive conception for the alternate operation of the transmitter and the receiver consists in operating the transmitter, during the transmitting intermissions, as an increaser of the ultra-high frequency in order to obtain a considerable improvement in the sensitiveness of reception.

There are various possibilities for the coupling of the transmitter and the receiver to the antenna system. For example, the antenna system can be coupled with the transmitter and the receiver through an energy conducting device, a concentric energy conducting device being preferred due to the small radiation losses. A second possibility consists in coupling the antenna system with the transmitter and the receiver through the free radiation field.

The enclosed drawings describe several constructional examples of the radiator disclosed in this invention.

Figure 1 shows a parabolically curved radiator coupled with transmitting and receiving tubes by means of an energy-conducting device, Fig. 2 shows a parabolically curved radiator behind which transmitting and receiving tubes are located in series with one another, Fig. 3 shows a constructional example in which the transmitter and receiver operate in parallel upon a common energy conducting device, Figs. 4 and 5 show constructional examples in which the transmitter and the receiver can alternatively be coupled with the radiator, Fig. 6 shows a simplified construction of the examples disclosed in Figs. 4 and 5, Fig. 7 shows a constructional example in which the open end of the energy conducting device is closed by conducting surfaces which serve to produce a beam formation, Figs. 8a and 8b show a constructional example in which the transmitter and the receiver are arranged on the focal line of an elliptical cylinder, Fig. 9 shows a construction similar to that disclosed in Fig. 6 provided with a beam formation device, Fig. 10 shows a construction similar to that disclosed in Fig. 9 in which the conducting tube is bent at 90°, Figs. 11a and 11b show a constructional example similar to that of Fig. 7 with a slit-like opening for coupling the radiator with the beam formation device, and Figs. 12a and 12b show another modification of the invention.

Fig. 13 shows a modification of the invention embodying the features of the arrangement shown in Fig. 4 and also embodying the bent tube arrangement as shown in Fig. 10, Fig. 14 shows diagrammatically an arrangement for alternately varying the grid potential of the transmitting and receiving elements at a high frequency whereby, in effect, continuous transmission and reception on carrier waves of the same radio frequency are possible.

In the case of the example shown in Figure 1, electron tubes with a resonator constructed as a closed chamber serve for the transmission and reception. Such tubes have already been described in detail in prior preceding applications, for example in application No. 8,938, filed March 1, 1935, inter alia. The antenna arrangement consists of a parabolically curved surface-like conductor 101, through which extends in the neighborhood of the crown a concentric energy-conducting device 102, 103. The external conductor 103 of this concentric energy-conducting device is connected galvanically with the surface-like conductor 101 at the passing-through places. In the plane of symmetry of the antenna arrangement the external conductor 103 is further provided with a slit-like opening 104, through which the antenna arrangement is coupled with the internal space of the concentric energy-conducting device. The opening is preferably closed by means of a di-electric body. To the left hand end of the concentric energy-conducting device there is connected for example a transmitting tube 105 and to the right hand end a quite similarly built receiving tube 106. There are here in question tubes with a resonator formed as a chamber. It is worthy of note that the hollow metal body surrounding the tubes 105 and 106 in all directions is continued directly into the internal and external conductors 102 and 103 of the concentric energy-conducting device, so that there cannot on the way between the transmitting arrangement and the receiving arrangement and the antenna arrangement, be the smallest loss of radiation. It is further of importance that the length of the energy conducting device be made so great that there occur at the slit 104 of the antenna arrangement a potential node and a current loop, whereby there is chiefly produced a symmetrical directional characteristic of the antenna arrangement. Furthermore, it is to be observed that the characteristic impedance of the two parts of the energy-conducting device is made so large that the antenna arrangement represents a damping resistance that is suited to the two tubes.

As already mentioned the two tubes may work with the same wave and with different waves. When the two tubes work with different waves, the left-hand and the right-hand sections of the energy conducting device must of course be differently tuned. There may then be advantageously provided, as already indicated, in one or in both sections, filtering means that assist in the uncoupling of the two tubes and consequently in the reduction of the mutual disturbances.

In the constructional example shown, a single radiator device cooperates with a transmitting and a receiving tube. Instead of a single antenna device, there may of course be employed an antenna device consisting of several such or similar elements. Also for the purpose of increasing the transmission output several transmitting tubes may work in parallel or in series on the directional antenna device; and it is likewise possible to use, for the purpose of increasing the receiving sensitivity, more than one receiving tube, preferably several receiving tubes connected in series.

A constructional example with transmitting and receiving tubes located in series with one another is shown in Figure 2. The directional antenna arrangement consists in this case of a parabolically curved reflector 107, into the internal space of which there projects a bar antenna 108. The arrangement serves accordingly in this example for the transmission and reception of a tubularly formed ray. The transmitting tube and the receiving tube have in this case also a resonator formed as a chamber. The two have in common a vacuum vessel which is formed by the external conductor 110. The internal conductor 109 has two grids 111 and 111' and within the grids cathodes 112 and 112'. An intermediate conductor 114 or 114' supported by insulators 113 between the internal or external conductors 109, 110 serves in its middle portion as a solid-walled electrode. The space between the insulating conductor 109 and the intermediate conductor 114 or 114' serves as a resonator. The resonator of the tube located next to the antenna 108 is coupled directly with the antenna through the energy-conducting device formed by concentric and plate-like conductors 115 and 116. The resonator of the second tube is coupled with resonator of the first mentioned tube and of the first mentioned energy-conducting device only indirectly; and, in fact, through the energy-conducting device formed of plate-like concentric conductors 115' and 116'. As the coupling between the resonator of the tube and the antenna in the case of tubes in the braking-field connection must be very loose, the characteristic impedance of the two energy-conducting devices is made relatively small. The two energy-conducting devices are advantageously tuned to the quarter wave length.

The arrangement may be used in particular for transmitting and receiving with the same wave length, one of the two tube parts then serving as a transmitter and the other as a receiver. As may be seen from the figure, the electrodes 114 and 114' and the two cathodes 112 and 112' are given different potentials. Consequently one part may be connected as a transmitter and the other part as a receiver. If now, for example, the braking-field connection is used for the undamping or excitation, the arrangement can, as already pointed out, be reversed periodically from transmitting to receiving by varying the working potentials. In this case there results further as a special advantage the possibility of using the transmitting part as an ultra high frequency amplifier on reversal.

Figure 3 shows a constructional example in which the transmitting and receiving tubes operate in parallel upon a common energy-conducting device. The transmitting and receiving tubes 105 and 106 are in this case the same as in the case of the preceding example. The antenna arrangement consists in this case of the funnel shaped part 117 and the internal conductor 118 which is co-axial therewith. For coupling the two tubes 105, 106 with the antenna device there serve two energy-conducting devices 119, 120 and 119' and 120'. The two energy-conducting devices consist of resonance elements that repeat periodically, such as have been already described in detail in application No. 18,232. The arrangement is also specially suitable for working with adjacent wave lengths, the energy-conducting devices formed in the way shown then serving for the uncoupling of the transmitter and the receiver.

In order to produce a complete uncoupling of the transmitter and the receiver, there may be used in the case of this constructional example an arrangement that enables the transmitter and the receiver to be alternately completely uncoupled from the antenna arrangement. If there is provided for example at the place of the merging of the two energy-conducting devices into the common conductor or conducting device a screen which is movable to and fro and which either closes the one or the other energy-conducting device or bridges over the internal and external conductors, such a complete uncoupling can be produced. In this case the same wave length can of course be used for transmitting and receiving.

A constructional example in which the transmitter and the receiver can be coupled to the antenna device alternately is shown in Figure 4. The transmitter and the receiver consist of electron tubes 121 and 121' which comprise in the interior of the glass vessel oscillatory circuits 122 and 122' built with the electrodes. The two electrode tubes can be inserted through openings into the internal space of a concentric conductor arrangement 123, 124 serving as an energy-conducting device. Adjoining the openings in the tube are tubular attachments 125, 125' and tubular parts 126, 126' which serve for the mounting of the tubes and their leading-in wires and are adjustable telescopically in an axial direction. The two parts 126 and 126' are rigidly connected together by a strong arm 127. The left-hand end of the concentric energy-conducting device 123, 124 is closed by a conductive piston 128 which is adjustable along the longitudinal axis. Attached to the right-hand end of the external conductor 123 is a parabolically curved reflector 129. The internal conductor 124 extends through an opening in the reflector 129 into its chamber and is conductively connected with the end of a di-pole antenna 130 that is approximately perpendicular to the axis of the conducting device. The two axes of the energy-conducting device 123, 124 and the reflector 129 are in the case represented displaced in relation to each other by half the di-pole length. The di-pole antenna is consequently symmetrical in relation to the reflector. Instead of being attached to the end of the di-pole the internal conductor of the energy-conducting device may be attached to a middle part. The di-pole length is advantageously λ/4.

The mode of operation of the arrangement is as follows: When the working conditions of the two tubes 121 and 121' are chosen in such a manner that for example the tube 121 works as a transmitter and the tube 121' as a receiver, the transmitting and receiving tubes can be brought alternately into the internal space of the concentric energy-conducting device by moving the bow 127. In the case represented, the transmitting tube is located in the internal space of the concentric energy-conducting device, but the receiving tube is practically outside thereof. The oscillatory circuit 122 operating as a transmitter is consequently coupled maximumly with the field space of the conducting device and the receiving circuit 122' is practically not coupled. The arrangement consequently works as a transmitter; by a simple movement of the bow 127 the receiving tube can be coupled and the transmitting tube practically uncoupled.

If the two oscillatory circuits of the transmitting and receiving tubes consist of a closed wire circuit, they have the property of magnetic di-poles. The coupling is then effected advantageously at a potential node of the concentric Lecher system that forms. In the case of the use of electric di-poles, the coupling is effected advantageously in the neighborhood of a potential loop. The tuning of the piston 128 in case of the employment of magnetic di-poles occurs when the distance between the oscillatory circuits and the internal bounding surface of the piston is equal to half the wave length or a whole number multiple thereof. In the case of an electric di-pole this distance is about λ/4 or an odd numbered multiple thereof. The most favorable distance between the oscillatory circuits and the antenna 130 is advantageously determined by experiment. The reflector and external tube of the arrangement are advantageously earthed. The reflector then forms substantially the counterpoise for the antenna connected to the internal conductor.

If it is desired to provide the antenna arrangement on the external side of buildings, ships, vehicles, or aircraft and to have at the same time the possibility of using the transmitter and the receiver, the distance between the two tubes and the antenna arrangement must be made great in comparison with the wave length. The energy-conducting device may then extend along bends.

Another constructional example which is similar to the preceding one, is shown in Figure 5.

The difference in comparison with the example shown in Figure 4 consists in that the two transmitting and receiving tubes 121 and 121' are coupled side by side to the concentric energy-conducting device 123, 124 and are arranged in a fixed position in relation thereto. For tuning the left-hand part of the concentric energy-conducting device there serves also in this case the adjustable conducting piston 128. The reflector and antenna arrangement corresponds likewise to the arrangement of Figure 4. In order that the transmitter and the receiver may be located at the same favorable distance in relation to the antenna 130, they must be arranged at a distance apart of half the wave length or a whole number multiple thereof. As has been already mentioned in connection with preceding examples, the reversal of the transmitter and the receiver is effected in this way also by electrical means. In the drawings there is indicated also a second possibility of the reversal by means of screens. Between the two tubes 121 and 121' there is a part which consists substantially of two cap-like conductors 131 and 131' and which is movable in the longitudinal direction. In the tube 123 there is provided further a slot through which a handle 132 is connected with the connecting bar 133 of the two caps. Now, as will be seen, by moving this arrangement to and fro one or the other tube can be covered over and thus, in a manner similar to that of the preceding example, the coupling between the oscillatory cirsuits existing in the tubes and the concentric energy-conducting device can be alternately weakened or strengthened.

Experiments have shown that the arrangements described in the preceding two examples may be still considerably simplified. There is obtained a beam formation that is sufficient for many purposes with an arrangment which as is shown in Figure 6, consists of a tube 134 which contains in its interior the transmitting and receiving tube 121, 121'. The tube is preferably made with a cylindrical or elliptical cross-section. The diameter or the diameters is or are preferably made of the order of magnitude of the wave length. The distance apart of the transmitting and receiving circuits is in this case also advantageously made equal to the half length or to a whole-number multiple thereof. Likewise the distance between the internal end surface of the movable piston 128 and the next oscillatory circuit of the tube 121 is in the case of the use of magnetic di-poles equal to the half wave length or a whole-number multiple thereof. In the case of the use of an electric di-pole in the tubes 121 and 121' the last mentioned distance must agree approximately with the quarter wave length or an odd number multiple thereof. For the outward radiation and inward reception of oscillatory energy there serves in this case directly the opening 135 at the right-hand end of the tube 134. It has been found that when the part of the tube between the opening 135 and the transmitting or receiving circuit is of sufficient length there can be obtained a relatively good beam formation.

The antenna arrangement hereinbefore described presents special advantages when it is a question of transmitting or receiving through relatively thick walls or through articles of a certain thickness. The arrangement may then be varied in length for example according to the principle of a telescopic mask and be tuned to the correct length by suitable cranking out.

Also, it is possible in the case of a vertical arrangement of the tube and in case of an arrangement of a reflector inclined if required to an angle in particular of 45°, to use the arrangement to radiate over impediments. It is possible in that case to adjust the tube accurately to the length at which an optimum output is obtained. Instead of employing reflectors inclined at an angle, the tube may be provided at the end with a bend. Of course a number of such arrangements may be combined together to form a group antenna for the purpose of producing an enhancement of the directional effect.

For special cases it is desirable that the internal space of the tube 134 in the example of Figure 6 should not communicate with the external space. In order to prevent this the end surface of the tube 135 may for example be provided with a thin di-electric screen.

A constructional example with a metal closure at the opening 135 is shown on the contrary in Figure 7. For the closure of the opening in this case there serves a conductor 136 which is formed as a parabolic reflector and which is provided in the neighborhood of its focus with an antenna 137. The coupling of the antenna 137 to the internal space of the tube 134 is effected in this case by a conductor 138, which extends through the reflector 136 in the neighborhood of the crown and is insulated therefrom. At the place where it extends through there may be provided a gas-tight insulator 139. The length of the conductor 138 projecting into the internal space of the tube 134 may be tuned to the wave length in the most favorable manner, in particular by causing a potential node to be formed at the place of extending through and a potential loop at the edge. Of course it is not necessary that, as shown, the opening of the reflector 136 should be made equal to the opening of the tube 134. For the purpose of enhancing the beam-formation effect, the reflector may be given a considerably larger opening than the tube.

If difficulty be found in enclosing the internal space of the tube 134 in a gas-tight manner, it may be kept under a light excess pressure, so that the access of impure air from outside through possible leaks is rendered impossible.

Instead of a tube formed with a cylindrical or elliptical cross-section, there may of course, be used other metallic hollow bodies that have transmitters and receivers and are provided at least on one side with openings through which the radiation can pass out or in. Figures 8a and 8b show a constructional example in which the transmitting and receiving tube 121 and 121' are placed at the focal lines of an elliptical cylinder which is closed at both ends. The right-end portion of the elliptical cylinder 140 is removed and there is connected at the opening thus produced a parabolic reflector 141, the focal line of which coincides with the focal line of the elliptical hollow body. This arrangement also is suitable for simultaneous or alternate transmitting and receiving. The distances apart of the oscillatory circuits provided in the two tubes, or the focal length of the ellipse, must in this case be in rational relationship to the half wave length or to the quarter-wave length in a manner similar to that already described if the most favorable conditions of working are to be maintained. Instead of the cylindrical arrangement there may of course be a rotationally symmetrical one or an arrangement with an elliptical cross-section.

A constructional example with a hollow body containing a tubular transmitter and a tubular receiver is shown in Figure 9. The constructional example shown in the figure is quite similar to that shown in Figure 6 with the exception that the opening 135 provided for the inward and outward passage of the radiation is furnished with a reflector arrangement 142 for the purpose of improving the beam formation.

In the example of Figures 6 and 9, the preferable direction of the radiation coincides with the axial direction of the tube. Instead of this, the tube 134 may be bent particularly if impediments are to be circumvented. An example corresponding to this constructional form is represented in Figure 10. The tube 143, which is bent at its upper end at 90°, is provided with a closure reflector 142 just as in the preceding example. The upper portion of the arrangement is, further, adjustable telescopically in a vertical direction in order to enable impediments of different heights to be overcome.

Figures 11a and 11b show a constructional example which is similar to that of Figure 7 except that for the coupling of the parabolic radiator 144 there serves a slit-like opening provided in the crown thereof. It has been found that such a narrow opening suffices for coupling the internal space of the tubular hollow body 134 with the internal surface of the concavely arched radiator 144.

Figures 12a and 12b show in cross-section and longitudinal section a constructional example according to the invention in the case of which it is a question of bringing an arrangement suited for simultaneous or alternate transmitting and receiving into connection with the external space by means of an opening, maybe comparable with the wave length, in the wall. The transmitting and receiving arrangement consists in this case of two separate parts which can be passed one after the other through the opening 145 in the relatively thick masonry or like wall 146 and which consists in each case of a reflector 147 with a λ/4 antenna 148, an energy-conducting device 149, and a transmitting or receiving tube 150 or 151'. The diameters of the two reflectors are made so great that they singly just pass through the opening 145. The mounting of the arrangement is effected in the following manner: First of all the upper portion is passed through the opening, and, after the reflector has reached the outside, the arrangement is pressed to one side. The second part is then pushed through the opening, and there must then be provided in the edge of the reflector a small recess for the conductor of the first part. Advantageously the part serving as the receiver is arranged somewhat behind the transmitter in order to produce as great an uncoupling as possible.

In Fig. 14 there is shown diagrammatically an arrangement for varying the grid potentials of the transmitter and receiving tubes alternately whereby these tubes alternate in operation for the purpose of providing continuous and simultaneous transmission and reception. This arrangement can be applied, for example, to the apparatus illustrated in Fig. 13 to cause the transmitter and receiver to operate alternately in such manner that the transmission and reception are both continuous. As shown for the purposes of illustration, the grids of the transmitter tube 159 and the receiver tube 160 are alternately connected to receive voltage from the battery 161, thus causing these tubes to operate alternately for the purposes hereinabove discussed.

In the case of experiments made with such arrangements working was effected with wave lengths of 20 centimetres and under, preferably with a wave length of about 14 centimetres. The diameter of the tube in the case of the example of Figure 6 was 15 centimetres in a most favorable case. The distance from the middle of the transmitting or receiving tube to the opening of the tube was about 14 wave lengths.

We claim:

1. Apparatus for the directional transmission and reception of ultra high frequency electromagnetic waves comprising a transmitter, a receiver and an antenna comprising at least one conducting surface and serving directly as transmitting and receiving antenna for said transmitter and receiver, a conducting tube coupling the antenna to the transmitter and the receiver, said transmitter and receiver being placed within this conducting tube.

2. Apparatus for the directional transmission and reception of ultra high frequency electromagnetic waves comprising one transmitter, one receiver and one antenna comprising at least one conducting surface and serving directly as transmission and reception antenna for said transmitter and receiver, a conducting tube coupling the antenna to the transmitter and the receiver, the transmitter and the receiver being placed within this conducting tube, the antenna forming a constructional unity with the conducting tube, the distance between the transmitter and receiver being a multiple of a half wave length, and the distance of the transmitter and receiver from the opening of the tube being greater than the wave length.

3. Apparatus for the directional transmission and reception of ultra high frequency electromagnetic waves, comprising a transmitter, a receiver and an antenna comprising at least one conducting surface and serving directly as transmitting and receiving antenna for said transmitter and receiver, a conducting tube coupling the antenna to the transmitter and the receiver, the transmitter and the receiver being provided internally in this conducting tube, the antenna forming a constructional unity with the conducting tube, the distance between the transmitter and the receiver being equal to a multiple of a half wave length and the distance of the transmitter and the receiver from the opening of the tube being larger than the wave length, the diameter of the conducting tube being of the order of magnitude of the operating wave length.

4. Apparatus for the directional transmission and reception of ultra high frequency electromagnetic waves comprising a transmitter, a receiver and an antenna comprising at least one conducting surface and serving directly as transmission and reception antenna for said transmitter and receiver, a conducting tube coupling the antenna to the transmitter and the receiver, the transmitter and the receiver being provided in the internal space of this conducting tube, the conducting tube being at one end practically closed against the antenna and being coupled with same only by an opening which is small in comparison with the cross section of the antenna.

5. Apparatus for the directional transmission and reception of ultra high frequency unconfined electromagnetic waves comprising an antenna serving for directive transmission and reception, a transmitter tube, a receiver tube, and a conducting tube formed as an energy conducting device coupling the transmitting and receiving tube to the antenna, the transmitting and receiving tubes being positioned in the internal space of the conducting tube and being operatively connected by it to the antenna for transmission and reception.

6. Apparatus for the directional transmission and reception of ultra high frequency unconfined electromagnetic waves comprising an antenna serving for directive transmission and reception, a transmitter tube, a receiver tube, a conducting tube formed as an energy conducting device coupling the transmitting and receiving tube to the antenna, the transmitting and receiving tubes being positioned in the internal space of the conducting tube, and means to render operative the receiving tube to cause reception thereby while transmission by the transmitting tube is suspended and to render operative the transmitting tube to cause transmission thereby while reception by the receiving tube is suspended.

7. Apparatus for the directional transmission and reception of ultra high frequency unconfined electromagnetic waves comprising an antenna serving for directive transmission and reception, a transmitter tube, a receiver tube, a conducting tube formed as an energy conducting device coupling the transmitting and receiving tubes to the antenna, the transmitting and receiving tubes being of relatively slightly different natural frequencies and the natural frequency of the conductor tube and antenna being between the natural frequencies of the transmitting and receiving tubes, whereby the two tubes are capable of simultaneous independent operation for transmitting and receiving respectively.

8. Apparatus as described in claim 7 characterized by the provision of filtering means between the transmitter tube and the receiver.

9. Apparatus for the directional transmission and reception of ultra high frequency electromagnetic waves comprising a transmitter tube, a receiver tube and an antenna comprising at least one conducting surface and serving as a transmitting and receiving antenna for said transmitter tube and receiver tube, a conducting tube in which the transmitter and receiver are positioned and by which they are coupled to the antenna, the conducting tube being formed as a concentric energy conducting device, the conducting tube also serving as the wave generating electrode of the transmitter tube and the receiver tube.

10. Apparatus for the directional transmission and reception of ultra high frequency electromagnetic waves comprising a transmitter tube, a receiver tube and an antenna comprising outer and inner conducting elements and serving as a transmitting and receiving antenna for said transmitter tube and receiver tube, a conducting tube in which the transmitter and receiver are positioned and by which they are coupled to the outer element of the antenna, an inner conductor element within the conducting tube and forming with said tube a concentric energy conducting device, said conducting tube being electrically connected to the outer conducting element of the antenna and the inner conductor element being connected to the inner conducting element of the antenna.

11. Apparatus as defined in claim 5, wherein means is provided to render operative alternately at a frequency at least as high as audio frequency the receiving tube and the transmitting tube whereby transmission and reception may proceed coincidentally.

12. Apparatus as defined in claim 5, wherein the transmitter tube and the receiver tube are electronic tubes each having a grid and a brake electrode, and wherein means is provided to render the transmitter tube operative and inoperative alternately at high frequency by changing the grid potential and to render the receiver tube operative and inoperative alternately at the same high frequency by changing the brake electrode potential.

13. Apparatus for the directional transmission and reception of ultra high frequency unconfined electromagnetic waves comprising an antenna serving for directive transmission and reception, a transmitter tube, a receiver tube, a conducting tube formed as an energy conducting device coupling the transmitter and receiver tubes to the antenna, the transmitter and receiver tubes being arranged in the conducting tube, one nearer the antenna and one further from the antenna, means for impressing different potentials on the elements of the farther tube to render it operative or functionally inoperative and simultaneously impressing suitable potentials on the elements on the nearer tube to render it respectively operative as an amplifier between the antenna and the farther tube or operative in cooperation with the antenna.

WALTER DALLENBACH.
ERNST WILCKENS.
WOLFGANG PUPP.